United States Patent
Goodson et al.

(10) Patent No.: US 9,088,642 B2
(45) Date of Patent: Jul. 21, 2015

(54) SYSTEMS AND METHODS FOR HANDLING CROSSTALK VECTORING FAILURES IN MULTI-CARD VECTORING GROUPS

(75) Inventors: Richard Goodson, Huntsville, AL (US); Arlynn Wayne Wilson, Huntsville, AL (US); Fred Chu, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 13/411,053

(22) Filed: Mar. 2, 2012

(65) Prior Publication Data

US 2012/0224674 A1 Sep. 6, 2012

Related U.S. Application Data

(60) Provisional application No. 61/448,546, filed on Mar. 2, 2011.

(51) Int. Cl.
| | |
|---|---|
| H04M 3/22 | (2006.01) |
| H04M 3/18 | (2006.01) |
| H04W 24/02 | (2009.01) |
| H04B 3/32 | (2006.01) |
| H04M 3/34 | (2006.01) |
| H04L 27/26 | (2006.01) |
| H04L 12/70 | (2013.01) |
| H04M 3/30 | (2006.01) |

(52) U.S. Cl.
CPC . *H04M 3/18* (2013.01); *H04B 3/32* (2013.01); *H04L 27/2601* (2013.01); *H04M 3/34* (2013.01); *H04W 24/02* (2013.01); *H04L 2012/5675* (2013.01); *H04M 3/306* (2013.01)

(58) Field of Classification Search
USPC ............ 379/27.01, 417, 144.04, 166, 433.09, 379/26.01, 32.04, 130; 370/359, 419, 242, 370/201
See application file for complete search history.

(56) References Cited

U.S. PATENT DOCUMENTS

| | | | |
|---|---|---|---|
| 7,317,681 B1 | 1/2008 | Ben-Dvora et al. | |
| 8,605,567 B2 | 12/2013 | Wilkes et al. | |
| 2004/0085987 A1* | 5/2004 | Gross et al. | 370/430 |
| 2008/0285740 A1 | 11/2008 | Schelstraete et al. | |

(Continued)

FOREIGN PATENT DOCUMENTS

| | | | | |
|---|---|---|---|---|
| EP | 2 464 026 | * 10/2010 | | H04M 11/06 |
| WO | WO 2009/152188 | * 12/2009 | | H04B 3/32 |
| WO | 2011/009584 | 1/2011 | | |

*Primary Examiner* — Yosef K Laekemariam
(74) *Attorney, Agent, or Firm* — Maynard Cooper & Gale, P.C.; Jon E. Holland (57) ABSTRACT

A communication system comprises a plurality of line cards having transceivers coupled to a plurality of subscriber lines. Each line card has at least one active transceiver within the same vectoring group, and each line card also has vector logic capable of cancelling crosstalk induced by an active transceiver that is a member of the vectoring group. In the event of a vectoring fault that prevents a line card from receiving vectoring information from at least on other line card, the vector logic is configured to disable vectoring for the interferers affected by the error in order to prevent vectoring operations based on obsolete vectoring coefficients from adversely affecting the quality of the communicated signals. The transceivers communicating signals affected by the suspended vectoring operations are also configured to adjust their constellation density profiles, thereby reducing their data rates, to accommodate the increased noise level resulting from the loss of vectoring. By handling the vectoring fault in such manner, communication can continue without requiring a retrain.

14 Claims, 4 Drawing Sheets

(56) References Cited

U.S. PATENT DOCUMENTS

| | | |
|---|---|---|
| 2009/0207985 A1 | 8/2009 | Cioffi et al. |
| 2010/0034374 A1 | 2/2010 | Ohman et al. |
| 2011/0026575 A1 | 2/2011 | Shalom et al. |
| 2012/0243404 A1 | 9/2012 | Goodson et al. |
| 2012/0250490 A1 | 10/2012 | Goodson et al. |
| 2012/0250491 A1 | 10/2012 | Goodson et al. |

* cited by examiner

SYSTEMS AND METHODS FOR HANDLING CROSSTALK VECTORING FAILURES IN MULTI-CARD VECTORING GROUPS

CROSS REFERENCE TO RELATED APPLICATION

This application claims priority to U.S. Patent Application No. 61/448,546, entitled "Generalized Vectoring Architecture" and filed on Mar. 2, 2011, which is incorporated herein by reference.

RELATED ART

A digital subscriber line access multiplexer (DSLAM) is a device that connects multiple subscriber lines to a high-speed network line using digital subscriber line (DSL) modulation formats across the subscriber lines. In the downstream direction, a DSLAM generally demultiplexes a high-speed data stream from a network across the subscriber lines, and in the upstream direction, a DSLAM generally multiplexes the data streams from the subscriber lines for transmission across the high-speed network line. A DSLAM can be installed at a variety of locations, such as at a network facility (e.g., a central office) or an intermediate point between a central office and one or more customer premises.

A variety of DSL formats have been used for the communication from a DSLAM to a customer premises. Very-high-bit-rate DSL (VDSL) is a solution that is attractive due to the relatively high data rates enabled by VDSL as compared to other DSL solutions. Indeed, first generation VDSL provides data transmission up to about 52 Mega-bits per second (Mbit/s) downstream and about 16 Mbit/s upstream. Second generation VDSL, sometimes referred to as VDSL2, provides up to about 100 Mbit/s simultaneously in the both the upstream and downstream directions. The VDSL line code is discrete multi-tone (DMT) modulation, which uses a sequence of equally spaced frequencies or tones, each of which is modulated using quadrature amplitude modulation (QAM).

Like several other DSL technologies, VDSL suffers from the effects of crosstalk. However, VDSL standards specify vectoring techniques that allow crosstalk cancellation, and such techniques have been employed to cancel the crosstalk among subscriber lines extending from a DSLAM to one or more customer premises in an effort to improve the performance of VDSL signals and allow for longer reaches. However, VDSL vectoring is processing intensive, and as the number of subscriber lines increases, the amount of processing required to cancel crosstalk from the signals carried by the subscriber lines increases exponentially.

In this regard, to cancel crosstalk, vector logic (sometimes referred to as a "vector engine") maintains a set of vectoring coefficients respectively corresponding to the coupling functions between interfering tones (i.e., tones that induce crosstalk) and victim tones (i.e., tones affected by crosstalk). For each victim tone, the vector engine combines the symbol of the victim tone and each interfering tone with its corresponding vectoring coefficient, and the result becomes the new victim tone. In such manner, the crosstalk channel is effectively inverted, and the crosstalk is cancelled tone-by-tone for all tones. For transmitter-based precoding, the new victim tone is transmitted on the line, and the precoding effectively cancels the crosstalk as the victim tone propagates across the line and the crosstalk couples into the line of the victim tone. For receiver-based cancellation, the new tone is further processed by the receiver but with reduced crosstalk.

A single vector engine can process the coefficients for a limited number of tones, but additional vector engines can be added in order to increase the number of tones subject to the VDSL vectoring. In such case, the vector engines share vectoring information (e.g., tone symbols) so that a larger number of interfering tones can be canceled from each victim tone.

When a vectoring group spans across multiple line cards, the vectoring information should be communicated among the line cards. Reliably communicating vectoring information among multiple line cards can be problematic, particularly for vectoring groups that process a large number of tones thereby generating a large amount of vectoring information.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for handling crosstalk vectoring failures in multi-card vectoring groups. In one exemplary embodiment, a communication system comprises a plurality of line cards having transceivers coupled to a plurality of subscriber lines. Each line card has at least one active transceiver within the vectoring group, and each line card also has vector logic capable of cancelling crosstalk induced by an active transceiver that is a member of the vectoring group. Further, the line cards are coupled to one another via a ring connection across which vectoring information is passed from one line card to the next. In this regard, the ring connection carries a data stream, referred to hereafter as "vectoring stream," having a plurality of time slots respectively allocated to the line cards. As the vectoring stream is communicated, each line card inserts vectoring information (e.g., the symbols received by such line card from the subscriber lines or to be transmitted by such line card across the subscriber lines) into the time slots allocated to it. Further, each line card reads the vectoring information of other line cards from the time slots allocated to the other line cards. Accordingly, the vector logic on a given line card has sufficient access to the vectoring information of the other line cards to cancel crosstalk induced by interfering tones communicated across any of the subscriber lines regardless of which line cards receive or transmit the interfering tones.

In some situations, a failure within the system may prevent one or more line cards from receiving the vectoring stream and, hence, vectoring information from other line cards. In such case, vectoring cannot be successfully performed to remove the crosstalk induced by at least some interferers, and it is likely that some transceivers are attempting to communicate at a data rate that cannot be successfully supported. In this regard, vectoring generally reduces the overall noise level for the signals communicated by the transceivers such that the transceivers can communicate at a higher data rate than would otherwise be possible in the absence of vectoring. The loss of vectoring due to a failure of the ring connection effectively increases the overall noise level such that the same data rate used prior to the failure may result in an unacceptably high number of transmission errors after the failure. In such case, the transceivers are configured to reduce their data rates to ones that are suitable for the noise conditions after the failure. In one exemplary embodiment, such a reduced data rate is selected based on training information and/or data indicative of the present line characteristics such that a retrain is not required after the failure. Thus, when a loss of vectoring information is detected, the transceivers automatically revert to a lower data rate without having to perform a retrain, thereby enhancing the robustness and resiliency of the system.

Figure 1:
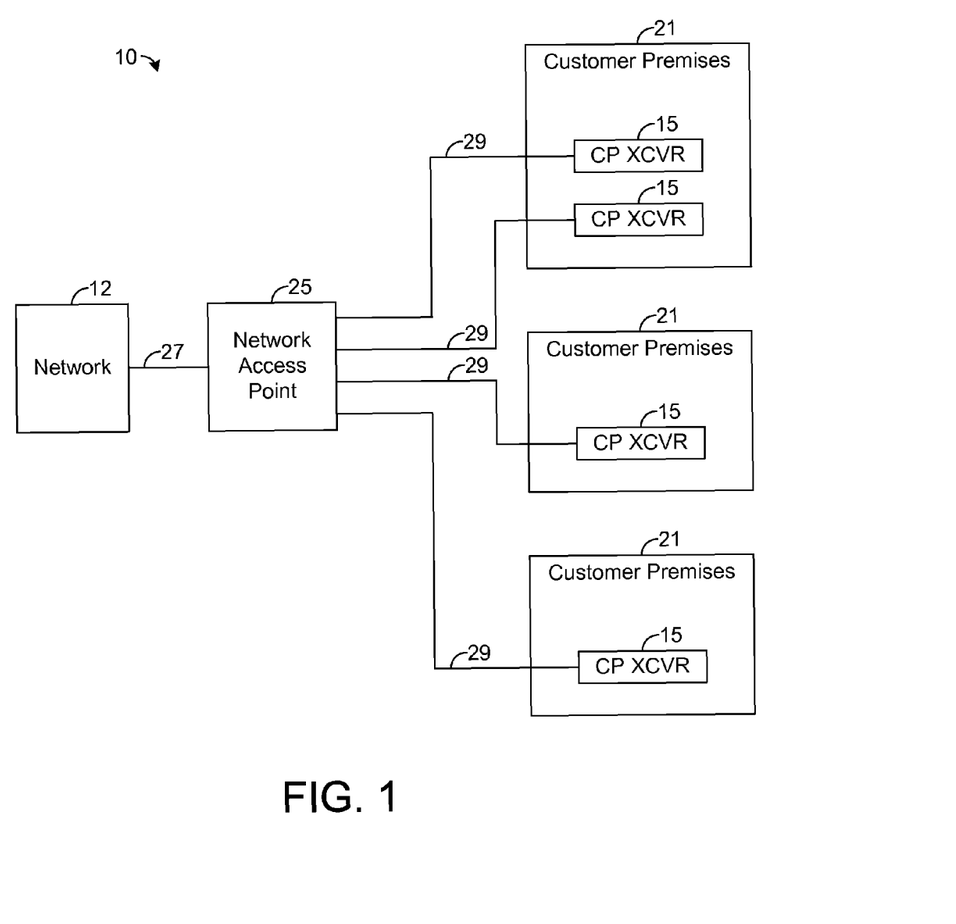
FIG. 1 is a block diagram illustrating an exemplary embodiment of a communication system.

FIG. 1 depicts an exemplary embodiment of a communication system 10. As shown by FIG. 1, the system 10 comprises a network 12, such as the public switched telephone network (PSTN) or other communication network, configured to communicate with CP transceivers 15 at one or more customer premises 21. In this regard, the network 12 is coupled to a network access point 25 via a network line 27, such as one or more twisted-wire pairs or optical fibers, and the network access point 25 is coupled to the CP transceivers 15 via a plurality of subscriber lines 29, such as twisted-wire pairs or optical fibers. For simplicity, FIG. 1 depicts four subscriber lines 29, but there can be any number of subscriber lines 29 in other embodiments. Further, the lines 29 in FIG. 1 extend to multiple customer premises 21, but it is also possible for the lines 29 to extend to a single customer premises 21.

In a downstream direction, the network access point 25 receives a high-speed data stream from the network 12 via the network line 27 and forwards packets from the high-speed data stream across the plurality of subscriber lines 29. In an upstream direction, the network access point 25 receives data streams from the customer premises 21 via the subscriber lines 29 and transmits packets from such data streams across the network line 27 to the network 12.

In one exemplary embodiment, the network line 27 comprises an optical fiber, and optical modulation formats are used to communicate data across the fiber. In addition, each subscriber line 29 comprises at least one twisted-wire pair, and digital subscriber line (DSL) modulation formats are used to communicate data across the subscriber lines 29. Note that there are a variety of DSL modulation formats that may be used for communicating data across the subscriber lines 29, such as asymmetric DSL (ADSL), high-bit-rate DSL (HDSL), very-high-bit-rate DSL (VDSL), and single-pair HDSL (SHDSL). For illustrative purposes, it will be assumed hereafter that the modulation format used for each subscriber line is VDSL, such as first generation VDSL or VDSL2, but it should be emphasized that other DSL and/or non-DSL modulation formats may be used in other embodiments.

Figure 2:
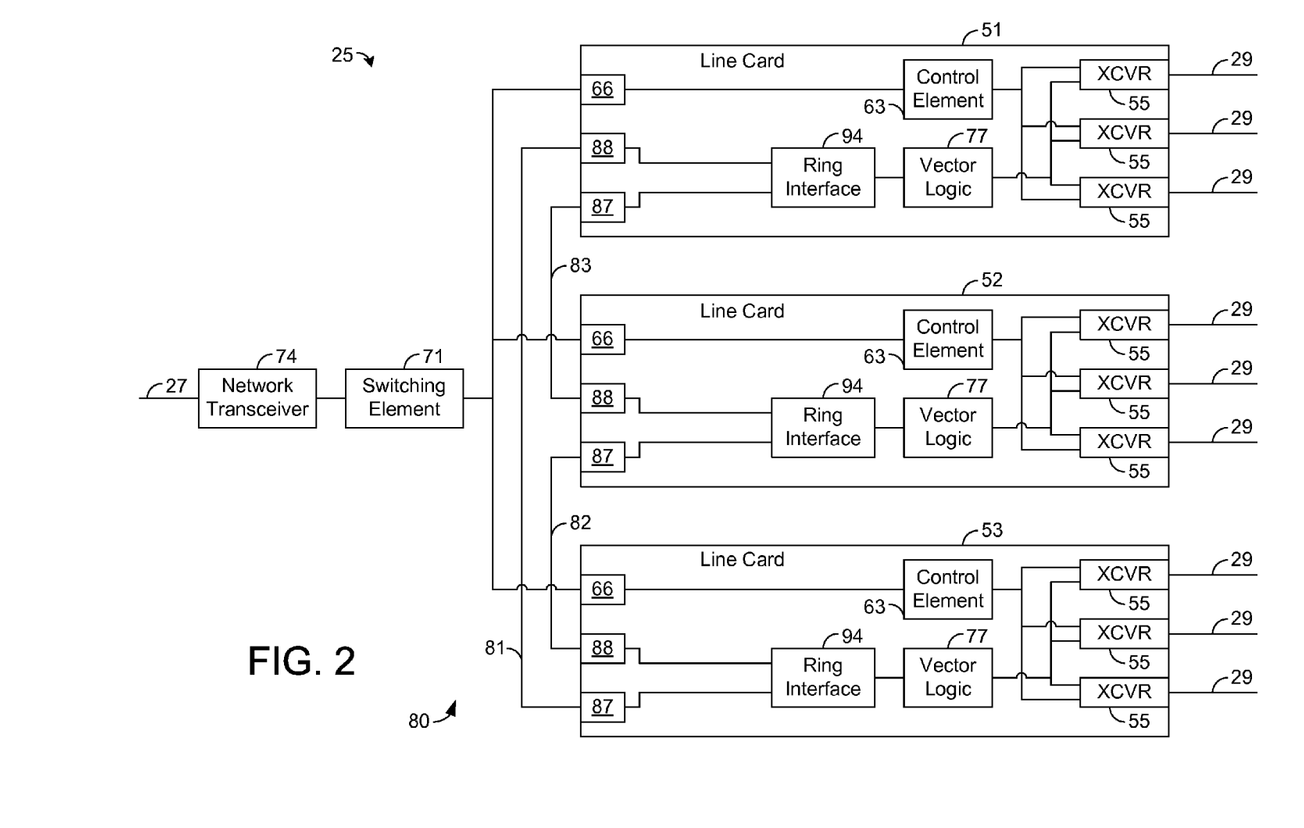
FIG. 2 is a block diagram illustrating an exemplary embodiment of a network access point, such as is depicted by FIG. 1.

FIG. 2 depicts an exemplary embodiment of the network access point 25. The network access point 25 comprises a plurality of line cards 51-53 coupled to the subscriber lines 29. In this regard, each line card 51-53 has at least one transceiver (XCVR) 55 coupled to at least one subscriber line 29. In the exemplary embodiment shown by FIG. 2, each line card 51-53 has three transceivers 55 respectively coupled to three subscriber lines 29, but any line card 51-53 may have any number of transceivers 55 and/or be coupled to any number of subscriber lines 29 in other embodiments. Further, it is unnecessary for each line card 51-53 to have the same number of transceivers 55 and be coupled to the same number of subscriber lines 29 as the other line cards. As will be described in more detail hereafter, each transceiver 55 is a member of the same vectoring group, but it is unnecessary for all of the transceivers 55 to be members of the same vectoring group in other embodiments. In one exemplary embodiment, the components of the same line card reside on a single printed circuit board (PCB), but it is possible for any line card to have more than one PCB, if desired.

As shown by FIG. 2, each line card 51-53 has a card control element 63 that is coupled to each transceiver 55 residing on the same line card 51-53. The card control element 63 controls the general operation of the line card 51-53 on which it resides, including the forwarding of data packets, as will be described in more detail hereafter. The card control element 63 may be implemented in hardware, software, firmware, or any combination thereof. Each card control element 63 is also coupled to a port 66, referred to hereafter as a "network-side port," which is coupled to a switching element 71. Further, the switching element 71 is coupled to a network transceiver 74 that is coupled to the network line 27.

In the downstream direction, assuming that the network line 27 comprises an optical fiber, the network transceiver 74 receives an optical data signal from the network line 27 and converts the optical data signal into an electrical signal comprising data packets. The switching element 71 is configured to forward the data packets to the line cards 51-53 based on header information within the data packets using forwarding techniques known in the art. Each data packet received by a line card 51-53 is received by the card's control element 63, which forwards the packet to at least one transceiver 55 for transmission across at least one subscriber line 29. When a transceiver 55 receives data packets from the card control element 63, the transceiver 55 modulates a carrier signal with the data packets using VDSL or some other desired modulation format in order to form a data signal that is transmitted across the subscriber line 29 coupled to such transceiver 55.

In the upstream direction, the transceivers 55 receive modulated data signals from the subscriber lines 29. For a given signal received by a given transceiver 55, the transceiver 55 demodulates the received signal to recover data packets. The transceiver 55 forwards the data packets to the card control element 63 that is residing on the same line card 51-53, and the card control element 63 forwards each packet received from the card's transceivers 55 to the switching element 71. The switching element 71 combines the packets received from all of the line cards 51-53 into a high-speed data stream, which is received by the network transceiver 74. Assuming that the network line 27 comprises an optical fiber, the network transceiver 74 converts the received data stream into an optical data signal for transmission across the network line 27 to the network 12 (FIG. 1).

As shown by FIG. 2, each line card 51-53 comprises vector logic 77 (e.g., one or more vector engines) configured to perform crosstalk vectoring in order to cancel crosstalk from the tones transmitted and/or received by the card 51-53 on which it resides. For example, the vector logic 77 of the line card 51 maintains vectoring coefficients for the tones communicated (i.e., transmitted or received) by the transceivers 55 of the card 51. Via known techniques, the vector logic 77 uses such vectoring coefficients to estimate crosstalk that affects the received tones or that will affect tones to be transmitted so that such crosstalk can be cancelled.

For example, the vector logic 77 of the card 51 stores sets of vectoring coefficients respectively corresponding to the tones communicated across the subscriber lines 29 coupled to the card 51. For a given tone, referred to in this example as "victim tone," received by one of the transceivers 55 from one of the subscriber lines 29, the corresponding set of vectoring coefficients includes vectoring coefficients respectively associated with the tones, referred to as "interfering tones," that interfere with the victim tone. Upon receiving a set of symbols simultaneously communicated across the subscriber lines 29, the transceivers 55 of the card 51 send such symbols to the vector logic 77 of the card 51. For each interfering tone, the vector logic 77 combines (e.g., multiplies) the tone's symbol with the associated vectoring coefficient to estimate an amount of crosstalk interference from the interfering tone affecting the victim tone. The vector logic 77 then cancels such crosstalk interference from the symbol of the victim tone by combining (e.g., subtracting) the estimate with the symbol of the victim tone. The vector logic 77 performs the same process for the symbols of the other interfering tones in order to cancel, tone-by-tone, crosstalk interference in the victim tone.

After removing the crosstalk interference induced by the interfering tones, the vector logic 77 sends the symbol of the victim tone back to the transceiver 55 that originally received it from a subscriber line 29. Such transceiver 55 decodes the symbol and generates an error signal indicating an error estimate for the symbol. The foregoing transceiver 55 sends the error signal to the vector logic 77, which adaptively updates the set of vectoring coefficients corresponding to the victim tone based on the error signal using a known coefficient update algorithm, such as least means square (LMS).

Thus, the vector logic 77 of the card 51 cancels, from the symbol of the victim tone, crosstalk induced by each interfering tone received by the card 51 from the subscriber lines 29. In one exemplary embodiment, the vector logic 77 uses the same techniques to cancel, from the symbol of the victim tone, crosstalk induced by interfering tones received by the other line cards 52 and 53. In this regard, the set of vectoring coefficients corresponding to the victim tone also includes vectoring coefficients associated with the tones received by the cards 52 and 53. As described above for the symbols received by the card 51, the vector logic 77 combines the symbols received by the transceivers 55 of the line cards 52 and 53 with the associated vectoring coefficients to estimate the amount of crosstalk induced by such symbols in the symbol of the victim tone. The vector logic 77 also combines such estimates with the symbol of the victim tone to cancel, tone-by-tone, the crosstalk induced by the interfering tones received by the line cards 52 and 53.

Further, such vector logic 77 uses similar techniques to precode the symbols transmitted by the transceivers 55 of the card 51 across the subscriber lines 29 such that crosstalk is cancelled as the symbols propagate across the subscriber lines 29. Specifically, the vector logic 77 receives symbols of interfering tones to be communicated across the lines 29 at the same time as a symbol of a victim tone to be communicated by the line card 51. For each interfering tone, the vector logic 77 combines (e.g., multiplies) the tone's symbol with the associated vectoring coefficient to estimate an amount of crosstalk interference that will affect the symbol of the victim tone. The vector logic 77 then combines (e.g., subtracts) the estimate from the symbol of the victim tone in order to precode the symbol so that crosstalk interference from the interfering tone is effectively cancelled during communication as it couples into the line 29 of the victim tone. The vectoring coefficients used for the precoding are updated based on the error associated with the victim tone, as determined by the CP transceiver 15 (FIG. 1) that receives the victim tone. Exemplary techniques for performing crosstalk vectoring, including symbol precoding, are described in commonly-assigned U.S. patent application Ser. No. 13/016,680, entitled "Systems and Methods for Cancelling Crosstalk in Satellite Access Devices" and filed on Jan. 28, 2011, which is incorporated herein by references. Note that the vector logics 77 of the other line cards 52 and 53 are configured similar to the vector logic 77 of the line card 51 in order to cancel crosstalk affecting the tones communicated by the lines cards 52 and 53, respectively.

Moreover, in one exemplary embodiment, the vector logic 77 and transceivers 55 of the line cards 51-53 form a vectoring group such that crosstalk from any interfering tone communicated across the subscriber lines 29 can be cancelled from any victim tone communicated across the subscriber lines 29. However, in other embodiments, it is unnecessary for each vector logic 77 and each transceiver 55 at the network access point 25 to be a member of the same vectoring group.

In order to enable each line card 51-53 to cancel crosstalk induced by tones communicated by the other line cards, vectoring information (e.g., tone symbols) is passed from one card to the other. For example, to enable the vector logic 77 of the line card 51 to cancel, from a victim tone received by the line card 51, crosstalk induced by interfering tones received by the line card 53, the line card 53 transmits symbols of the interfering tones to the line card 51. Similarly, to enable the vector logic 77 of the line card 51 to precode the symbols transmitted by the transceivers 55 of the line card 51 such that crosstalk induced by interfering tones transmit by line card 53 is cancelled as the symbols propagate across the subscriber lines 29, the line card 53 transmits symbols of the interfering tones to the line card 51. In one exemplary, a ring connection 80 comprising a plurality of segments 81-83 is configured to carry vectoring information from card-to-card. In this regard, each line card 51-53 has a plurality of ports 87 and 88, referred to hereafter as "ring ports," respectively coupled to a plurality of segments of the ring connection 80. For example, the ring port 87 of the line card 51 is coupled to one end of the segment 83, and the other end of the segment 83 is coupled to the ring port 88 of the line card 52. Further, the ring port 87 of the line card 52 is coupled to one end of the segment 82, and the other end of the segment 82 is coupled to the ring port 88 of the line card 53. Also, the ring port 87 of the line card 53 is coupled to one end of the segment 81, and the other end of the segment 81 is coupled to the ring port 88 of the line card 51.

As shown by FIG. 2, each ring port 87 and 88 of a given line card 51-53 is coupled to a ring interface 94, which is coupled to the card's vector logic 77. Thus, the vectoring information carried by the ring connection 80 is received and processed by the ring interface 94. Ultimately, such information is used by the vector logic 77 to perform crosstalk vectoring operations. Note that the ring interface 94 may be implemented in hardware, software, firmware, or any combination thereof.

In one exemplary embodiment, the vectoring stream carried by the ring connection 80 (FIG. 2) has time slots that are respectively allocated to the line cards 51-53, and each line card 51-53 inserts into the slots allocated to it vectoring information for enabling the other line cards to cancel crosstalk. As an example, refer to FIG. 3, which depicts an exemplary embodiment of a vectoring stream 125 carried by the ring connection 80. In this regard, the vectoring stream 125 comprises a field 131 allocated to the line card 51, a field 132 allocated to the line card 52, and a field 133 allocated to the line card 53. Each line card 51-53 is configured to insert vectoring information into the slots of the respective field 131-133 allocated to it, and the fields 131-133 shall be referred to herein as "vectoring fields."

Figure 3:
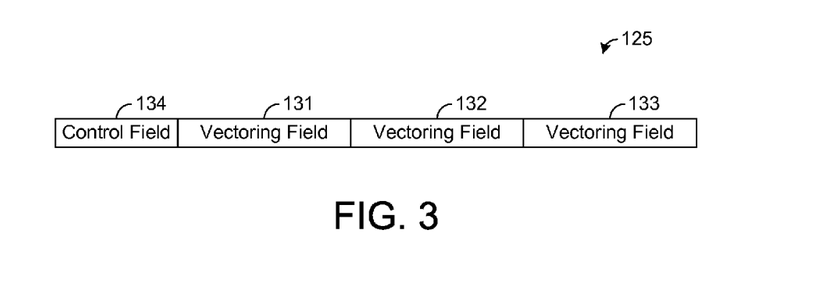
FIG. 3 is a block diagram illustrating an exemplary vectoring stream communicated across a ring connection, such as is depicted by FIG. 2.

For example, the vector logic 77 of the line card 51 is configured to transmit to the card's ring interface 94 the symbols of the tones communicated across the subscriber lines 29 coupled to the card 51. The ring interface 94 is configured to insert such symbols into the slots of the vectoring field 131 allocated to the card 51. The vector logics 77 of the other cards 52 and 53 are configured to use such symbols to cancel crosstalk. As an example, the vector logic 77 of the line card 52 may use the symbols in the vectoring field 131 to cancel crosstalk induced by the interfering tones received by the line card 51 from the subscriber lines 29 coupled to such card 51. Further, the vector logic of the line card 52 may use the symbols in the vectoring field 131 to precode the symbols transmitted by the transceivers 55 of the line card 52 such that crosstalk induced by interfering tones transmitted by the line card 51 is cancelled as the symbols propagate across the subscriber lines 29. Similarly, the other cards 52 and 53 are configured to insert symbols into the vectoring fields 132 and 133, respectively, allocated to such cards 52 and 53. Thus, the data carried by the ring connection 80 provides the symbols communicated across all of the subscriber lines 29 associated with the vectoring group so that each card 51-53 can cancel crosstalk induced by an interfering tone communicated by any subscriber line 29, regardless of which card 51-53 actually transmits or receives the interfering tone via the subscriber lines 29.

As shown by FIG. 3, the vectoring stream 125 also comprises a field 134, referred to hereafter as "control field," that may be used by the line cards 51-53 to transmit control information among the cards 51-53, as will be described in more detail hereafter. In one exemplary embodiment, the vectoring stream 125 is transmitted across the ring connection 80 (FIG. 2) from card-to-card in the same direction around the ring formed by the ring connection 80 and cards 51-53. For example, referring to FIG. 2, the vectoring stream 125 may be transmitted from the line card 51 to the line card 52 via the segment 83, from the line card 52 to the line card 53 via the segment 82, and from the line card 53 to the line card 51 via the segment 81. Alternatively, the vectoring stream 125 may be transmitted from the line card 51 to the line card 53 via the segment 81, from the line card 53 to the line card 52 via the segment 82, and from the line card 52 to the line card 51 via the segment 83. In other embodiments, other techniques for communicating the vectoring stream 125 are possible. For example, it is possible for the vectoring stream 125 to be transmitted in both directions, or for one portion of the vectoring stream 125 to be transmitted in one direction while another portion of the vectoring stream 125 is transmitted in the opposite direction. For illustrative purposes, it will be assumed hereafter that the vectoring stream 125 is transmitted in the same direction, clockwise, around the ring unless otherwise noted. Thus, unless otherwise noted, it will be assumed that the vectoring stream 125 propagates from the segment 81 to the segment 83 and then to the segment 82.

Exemplary techniques for communicating vectoring information via the ring connection 80 are described in commonly-assigned U.S. patent application Ser. No. 13/410,674, entitled "Systems and Methods for Communicating Vectoring Information for Multi-Card Vectoring Groups" and filed on even date herewith, which is incorporated herein by reference. In other embodiments, other types of connections between the cards 51-53 may be used to communicate the vectoring information.

During vectoring, it is possible for a failure to occur on any line card 51-53 or any segment of the ring connection 80. Depending on the type of failure that occurs, it is also possible that the failure may prevent the line card and/or ring connection 80 from successfully communicating the vectoring stream 125 to at least one line card 51-53. Any failure that prevents at least one line card from receiving vectoring information from at least one other line card shall be referred to herein as a "vectoring fault." When a vectoring fault occurs, a transceiver 55 on a line card 51-53 that stops receiving vectoring information from at least one other line card is likely to be communicating at a data rate that is higher than what is reliable for the current transmission characteristics of the system 10.

In this regard, vectoring generally reduces the overall noise level for the signals communicated by the transceivers 55 such that the transceivers 55 can communicate at a higher data rate than would otherwise be possible in the absence of vectoring. As an example, by using vectoring to cancel crosstalk induced by interferers communicated by the line cards 52 and 53, a transceiver 55 on the line card 51 can communicate at a higher data than would otherwise be possible in the absence of such vector processing. However, if a failure of the ring connection 80 and/or the line cards 52 or 53 prevents the line card 51 from receiving vectoring information from the line cards 52 and/or 53, then the vector logic 77 of the line card 51 is unable to use vectoring to successfully cancel the crosstalk induced by interferers communicated by the line cards 52 and/or 53. In such case, the overall noise levels of the signals communicated by the transceivers 55 of the line card 51 increase, and the data rate used by such transceivers 55 prior to the vectoring failure may result in an unacceptably high number of errors.

To compensate for foregoing effect, the transceivers 55 of the line card 51 are configured to automatically reduce their data rates in response to the vectoring fault, thereby reducing the number of transmission errors in the signals communicated by such transceivers 55. In one exemplary embodiment, such a reduced data rate is selected based on training information and/or data indicative of the current line characteristics such that a retrain is not required after the failure. Thus, when a loss of vectoring information is detected, the transceivers automatically revert to a lower data rate without having to perform a retrain, thereby enhancing the robustness and resiliency of the system 10. Exemplary techniques for selecting data rates will be described in more detail below, but it should be emphasized that, in other embodiments, other techniques are possible.

Prior to communicating data with a CP transceiver 15 (FIG. 1) in a data phase, each transceiver 55 (FIG. 2) at the network access point 25 is configured to enter into a training phase in which the transceiver 55 and its corresponding CP transceiver 15 negotiate a data rate to be used in the subsequent data phase. Generally, the transceivers 15 and 55 negotiate for the highest data rate that is supported by both transceivers 15 and 55 and that results in an acceptable signal quality, as indicated by a particular parameter, such as signal-to-noise ratio (SNR). In negotiating the data rate, the transceivers 15 and 55 assign a constellation density to each tone communicated across the subscriber line 29. As known in the art, the constellation density for a given tone represents the number of bits carried by each symbol of the tone. A higher constellation density means that each symbol carries more bits resulting in a higher data rate for the tone. Moreover, assigning the constellation density to a tone effectively sets the data carrying capacity for that tone.

Note that the assignment of constellation density (referred to as constellation encoding) is performed tone-by-tone. That is, an SNR measurement is performed for each tone, and the SNR measured for a given tone is used to select the appropriate constellation density for that tone. Thus, different tones may be assigned different constellation densities and, hence, can support different data rates. The aggregate data rate for all of the tones generally represents the overall data rate for the DMT signal.

During training, a given transceiver 55 defines and stores in memory data 166 (FIG. 4), referred to hereafter as "constellation density settings 166." Such settings 166 indicate the constellation densities that are assigned to each tone and are used by the transceiver 55 in formatting the data signals communicated by it. In this regard, the transceiver 55 is configured to control the constellation densities of the communicated tones so they are in accordance with the stored constellation density settings 166. Over time, as conditions on the line change, the transceiver 55 may update the constellation density settings 166 that were originally established during training. In general, such updates are usually gradual and in response to changes in a measured performance parameter, such as SNR. For example, if the SNR for a given tone increases, the constellation density for that tone may be increased, and conversely, if the SNR decreases, the constellation density for that tone may be decreased. As long as the changes in line conditions are gradual, such updates can be successfully performed without requiring a retrain. However, if a line event causes a significant, abrupt change in line conditions, such as the amount of noise affecting the communicated signals, the transceiver 55 may be unsuccessful in adapting to the changed line conditions requiring a retrain in order to re-establish communication with the far-end CP transceiver 15.

In one exemplary embodiment, at least one tone, referred to hereafter as the "control tone," is used during the data phase as a control channel for enabling the transceivers 15 and 55 to communicate control information. The constellation density of the control tone is selected to be low enough such that information may be successfully communicated via the control tone in the absence of crosstalk vectoring. This may be achieved by assigning to the control tone a constellation density during training and then not increasing the constellation density for any signal quality improvement resulting from vectoring. In such case, the control tone should be assigned a sufficiently low constellation density to ensure communication via the control tone even if there is a line card or connection failure that results in the loss of vectoring, though other techniques may be used to achieve a similar effect, if desired.

Figure 4:
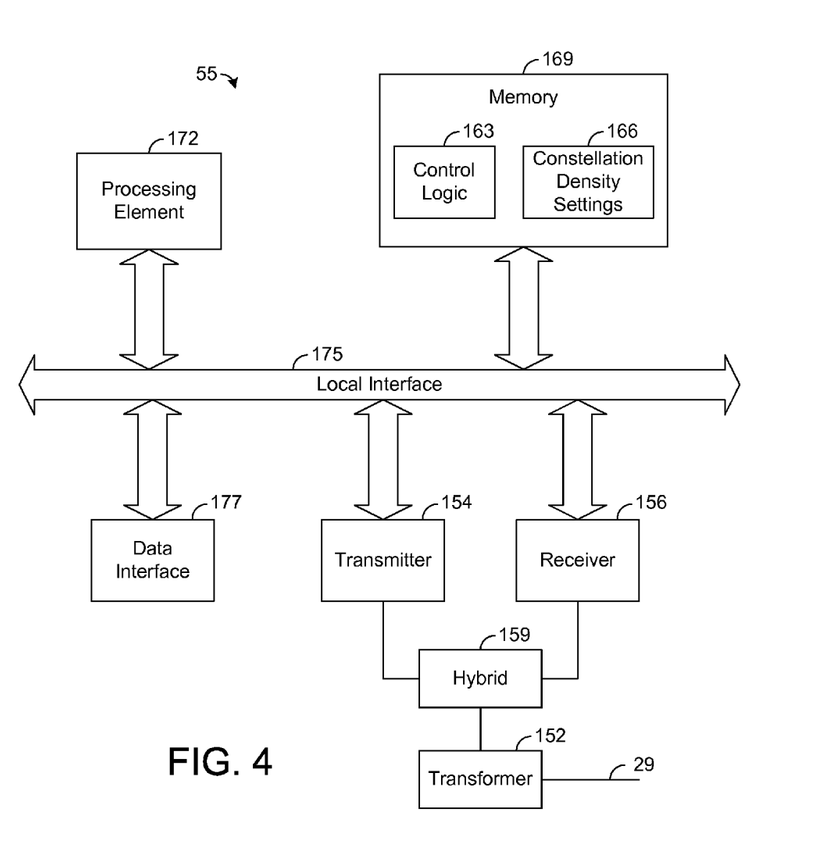
FIG. 4 is a block diagram illustrating an exemplary embodiment of a transceiver, such as is depicted by FIG. 2.

FIG. 4 depicts an exemplary embodiment of a transceiver 55. As shown by FIG. 4, the transceiver 55 comprises a transformer 152 that is coupled to a subscriber line 29 (FIG. 2). The transformer 152 is coupled to a transmitter 154 and a receiver 156 through a hybrid 159. The transmitter 154 transmits a DMT signal (e.g., VDSL signal), which is converted by transformer 152 to a voltage level suitable for communication across the subscriber line 29 coupled thereto. When a DMT signal is received from the subscriber line 29, the transformer 152 converts the line voltage to a matching signal before passing it to the receiver 156. The hybrid 159 separates the transmitted signals from the received signals in an attempt to keep energy from the transmitter 154 from affecting the signals received by the receiver 156.

As shown by FIG. 4, the transceiver 55 comprises control logic 163 for generally controlling the operation of the transceiver 55. For example, the control logic 163 communicates with the vector logic 77 (FIG. 2) that is on the same line card 51-53 and also controls (e.g., establishes and updates) constellation density settings 166 stored in memory 169. It should be noted that the control logic 163 can be implemented in software, hardware, firmware, or any combination thereof. In the exemplary embodiment illustrated in FIG. 4, the control logic 163 is implemented in software and stored in the memory 169.

Note that the control logic 163, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

The exemplary embodiment of the transceiver 55 depicted by FIG. 4 comprises at least one conventional processing element 172, such as a digital signal processor (DSP) or a central processing unit (CPU), that communicates with and/or drives the other elements within the transceiver 55 via a local interface 175, which can include at least one bus. Furthermore, the transceiver 55 comprises a data interface 177 for enabling the control logic 163 to communicate with external components and/or devices. As an example, the data interface 177 is coupled to the control element 63 (FIG. 2) and vector logic 77 (FIG. 2) for enabling the control logic 163 to communicate with such components.

As described above, during communication between a transceiver 55 at the network access point 25 and a CP transceiver 15 at a customer premises 21, crosstalk vectoring is employed thereby enabling the transceivers 15 and 55 to communicate at a relatively high data rate, referred to hereafter as the "primary data rate," considering that the crosstalk vectoring reduces the overall noise level. This primary data rate may gradually change over time during the data phase along with gradual changes to the physical characteristics (e.g., noise) of the subscriber line 29 across which the transceivers 15 and 55 are communicating.

After training, the transceiver 55 at the network access point 25 and the CP transceiver 15 at the CP 21 begin to communicate data signals at the primary data rate, and the vector logic 77 on the same line card performs vectoring, as described above, to enhance the signal quality of the communicated signals. To perform such vectoring, the vector logic 77 receives and uses vectoring information, including the symbols communicated by the transceivers 55 on the same line card as well as the symbols communicated by the transceivers 55 on the other line cards.

However, at some point, a failure (e.g., a failure of a line card 51-53 or of the ring connection 80) may prevent the vector logic 77 from receiving vectoring information from at least one other line card. Attempting to perform vectoring using incorrect or obsolete vectoring information may actually introduce noise that adversely affects the quality of the symbols being processed. Thus, when the vector logic 77 determines that it has stopped receiving vectoring information from at least one other line card, the vector logic 77 preferably stops performing at least some vectoring operations. Note that if the vector logic 77 stops receiving the vectoring information for only some interferers, then the vector logic 77 may be configured to stop performing crosstalk vectoring operations only for such interferers while continuing with vectoring operations regarding the interferers for which the vector logic 77 is receiving up-to-date vectoring information.

In addition to the vector logic 77 stopping vectoring operations for at least some interferers, the transceivers 55 are responsive to a detected vectoring fault for automatically reducing their data rates. In this regard, when the vector logic 77 on a given line card stops performing vectoring operations for at least some interferers, the vector logic 77 preferably notifies the control logic 163 (FIG. 4) of each transceiver 55 on the same line card. In response, the control logic 163 automatically updates the constellation density settings 166 to transition from the primary data rate to a lower data rate, referred to hereafter as a "secondary data rate," preferably without performing a retrain. Such secondary data rate is sufficiently low such that a given transceiver 55 may successfully communicate with its corresponding CP transceiver 15 in the absence of the vectoring operations that have been suspended in response to the vectoring fault while still achieving a desired performance.

In this regard, upon receiving a notification that the vector logic 77 has stopped crosstalk vectoring operations for at least some interferers, the control logic 163 of a given transceiver 55 is configured to cause the transmitter 154 (FIG. 4) to transmit a command, referred to hereafter as a "rate-switch command," to its corresponding CP transceiver 15 via the control tone described above. At this point, the vectoring operations may already be stopped, but communication via the control tone should nevertheless be successful since the control tone has a sufficiently low constellation density to ensure communication in the absence of vectoring, as described above.

The rate-switch command instructs the CP transceiver 15 to switch from the primary data rate to the secondary data rate. In one exemplary embodiment, the rate-switch command includes data indicative of the updated constellation density settings 166 so that the CP transceiver 15 can communicate according to the constellation density profile defined by the these setting 166, but other techniques of enabling the CP transceiver 15 to implement a desired constellation density profile are possible in other embodiments. In response to the rate-switch command, the CP transceiver 15 updates its constellation density settings (not specifically shown) for communication across the subscriber line 29 at a lower data rate. Thereafter, the transceivers 15 and 55 begin communicating at the secondary data rate. Thus, the transceivers 15 and 55 switch from the primary data rate to the secondary data rate in response to a vectoring fault without having to perform a retrain. Further, the network access point 25 is able to maintain communication with the CP transceivers 15, albeit at lower data rates, in the event of a failure that prevents vectoring information from being passed among the line cards 51-53.

Note that the constellation density profile indicated by the constellation density settings 166, as well as the data of the rate-switch command transmitted to the CP transceiver 15, may indicate the constellation densities of both upstream and downstream tones. It is also unnecessary for the upstream data rate to be the same as the downstream data rate. When a transceiver 55 detects a vectoring fault, data rates in both directions may be reduced since the loss of vectoring at the network access point 25 affects the quality of both upstream signals and downstream signals. The terms "primary data rate" and "secondary data rate," as used herein, may refer to rates in either the upstream or downstream direction.

In addition, it is unnecessary to stop all vectoring operations in response to a vectoring fault. For example, the vector operations for interferers communicated by the same line card may be continued, if desired. In this regard, assume that a ring connection failure prevents the line card 51 from receiving vectoring information from the line cards 52 and 53. In such an example, the vector logic 77 of the line card 51 may stop attempting to cancel crosstalk induced by interferers communicated by the line cards 52 and 53. However, the vector logic 77 may continue to cancel crosstalk induced by interferers communicated by the transceivers 55 of the same line card 51.

There are various techniques that can be used to determine the secondary data rate that is to be used in the event of a vectoring fault. As an example, the secondary data rate may be determined a priori. For example, a safe data rate within a significant margin of error may be selected by a technician, and data indicative of the constellation densities for achieving such a data rate may be stored in the transceivers 55 and/or 15. When a transceiver 55 is to switch to the secondary data rate, the transceiver 55 may be configured to update its constellation density settings 166 to implement the predefined constellation density profile for the secondary data rate. However, in one exemplary embodiment, the secondary data rate is dynamically determined based on training information and/or data indicative of the current line conditions in an attempt to achieve a secondary data rate that is as high as possible within a desired margin of error.

For example, the control logic 163 of a transceiver 55 may be configured to update the transceiver's constellation density profile to implement the secondary data rate based on at least (1) the current constellation density settings for the primary data rate prior to the rate switch and (2) the vectoring coefficients used by the vector logic 77 for vectoring operations. In this regard, the vectoring coefficients are indicative of the amount of crosstalk that is currently affecting communications. Generally, changes to the noise characteristics of a subscriber line 29 are often gradual. Thus, although the vectoring coefficients used by the vector logic 77 may become obsolete over time if they are not updated to adapt to the changing line conditions, the vectoring coefficients typically remain valid for a limited time period in the absence of updates. At the time of a vectoring fault, the vectoring coefficients likely indicate within a reasonable margin of error the crosstalk characteristics of the line (e.g., how much crosstalk interference is currently affecting each tone).

Using the vectoring coefficients, the control logic 163 of a transceiver 55 can estimate how much noise is being cancelled by the vectoring and, hence, how much each tone will be degraded if vectoring is stopped. Thus, based on the vectoring coefficients and information indicative of the current line conditions, such as the SNR value measured while vectoring was being performed prior to the vectoring failure, the transceiver 55 can estimate for each tone a respective SNR value (SNR') indicative of the tone's signal quality without the vectoring that has been or is to be stopped in response the vectoring fault. The transceiver 55 then assigns to the tone a constellation density suitable for the calculated SNR'. That is, the transceiver 55 assigns to the tone a constellation density assuming that the actual SNR of the tone is equal to the estimate of SNR'. Accordingly, the transceiver 55 should assign a sufficiently low constellation density such that the tone is successfully communicated despite the loss of vectoring resulting from the vectoring fault and the corresponding increase in the overall noise level.

An exemplary use and operation of a line card 51-53 for controlling the constellation density profile for a transceiver 55 will now be described in more detail below with particular reference to FIG. 5.

Figure 5:
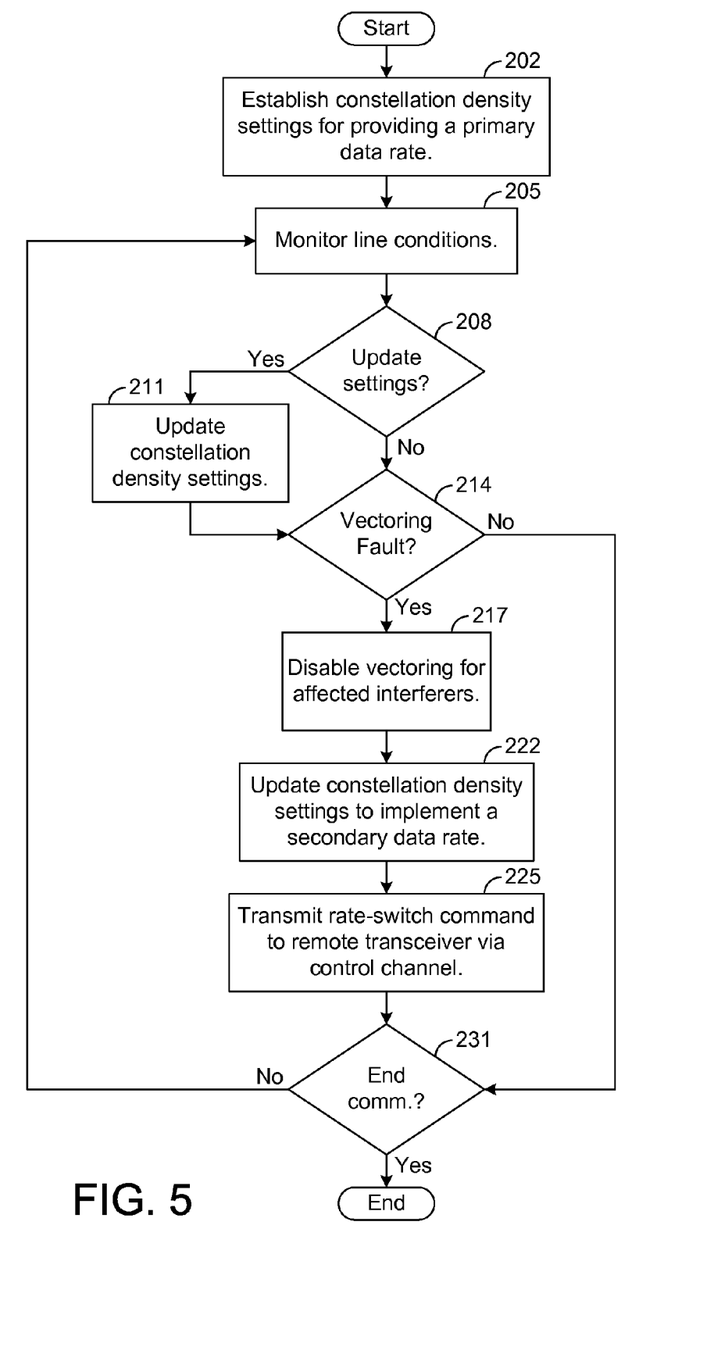
FIG. 5 is a flowchart illustrating an exemplary method of controlling a constellation density profile for a transceiver, such as is depicted by FIG. 4.

As shown by block 202 of FIG. 5, the control logic 163 (FIG. 4) of a transceiver 55 initially establishes the transceiver's constellation density settings 166. In this regard, the transceiver 55 communicates with the far-end CP transceiver 15 in a training phase in order to assign constellation densities, tone-by-tone, to each tone communicated between the transceivers 55 and 15. The control logic 163 establishes the settings 166 such that the assigned constellation densities are appropriately implemented in a subsequent data phase. After training, the transceivers 55 and 15 begin communicating according to the constellation density profile indicated by the constellation density settings 166 thereby achieving a primary data rate.

The control logic 163 monitors the line conditions, as shown by block 205 of FIG. 5, in order to determine whether the constellation density settings 166 should be changed in response to changes in the line conditions. As an example, the control logic 163 may determine the SNRs of the communicated tones and then determine in block 208 whether to update any of the constellation density settings 166 in response to a change in the SNR for a given tone. If the control logic 163 does decide to make such a change, the control logic 163 updates the appropriate constellation density settings 166 in block 211 thereby adjusting the primary data rate of the transceiver 55.

The control logic 163 also determines whether a new vectoring fault has been detected, as shown by block 214 of FIG. 5. There are various techniques that can be used to detect such an error. In one exemplary embodiment, the control logic 163 learns of a vectoring fault via the vector logic 77 (FIG. 2). For illustrative purposes, assume that a ring connection 80 failure occurs such that the vector logic 77 of the line card 51 stops receiving the vectoring stream 152 (FIG. 3) communicated across the ring connection 80. As an example, one of the segments 81-83 may be inadvertently severed such that the vectoring stream 152 is unable to propagate across the severed segment.

The vector logic 77 of the line card 51 detects the vectoring fault by determining when it stops receiving new vectoring information from the ring interface 94 of the same card 51. In response to the detected vectoring fault, the vector logic 77 notifies the control logic 163 (FIG. 4) of the detected error. The vector logic 77 also disables vectoring for the interferers for which it receives symbols from the ring connection 80, as shown by block 217 of FIG. 5. In the instant example, the vector logic 77 of the line card 51 receives from the ring connection 80 the symbols of the tones communicated by the other cards 52 and 53. Thus, the vector logic 77 stops vectoring operations for such tones. That is, the vector logic 77 stops attempting to cancel, from the tones communicated by the card 51, crosstalk induced by interferers communicated by the cards 52 and 53. The vector logic 77 may, however, continue canceling, from the tones communicated by the line card 51, crosstalk induced by interferers communicated by this same card 51 since the vector logic 77 has access to the symbols of such interferers. In this regard, such symbols are received by the vector logic 77 from the transceivers 55 of the line card 51, and the vector logic 77, therefore, does not rely on the ring connection 80 for such symbols.

In response to the detected vectoring fault, the control logic 163 determines a new constellation density profile that is suitable for the loss of vectoring resulting from the vectoring fault. In one embodiment, the control logic 163 estimates the effect of the vectoring loss on the signals communicated by the transceiver 55 based on the current set of vectoring coefficients being used by the vector logic 77 prior to the vectoring fault. As an example, based on the vectoring coefficients, the control logic 163 may estimate an increased noise level for the tones affected by the loss of vectoring. The control logic 163 may then estimate SNR' for each such tone using the tone's respective noise level, taking into account the estimated noise level increase resulting from the loss of vectoring. The control logic 163 may then assign to the tone a new constellation density, which is suitable for the tone's SNR'.

As shown by block 222, the control logic 163 updates the constellation density settings 166 as appropriate to implement the constellation density profile for the newly-assigned constellation densities.

As shown by block 225 of FIG. 5, the control logic 163 also transmits to the far-end CP transceiver 15, via the control tone, a rate-switch command having data indicative of the updated constellation density settings 166 so that the CP transceiver 15 may update its constellation density settings as appropriate to be consistent with those at the transceiver 55. Thereafter, the transceivers 55 and 15 begin communicating according to the new constellation density profile such that the transceivers 55 and 15 transition from the primary data rate to the secondary data rate, which is much lower than the primary data rate to account for the increased noise level resulting from the loss of vectoring.

Once the secondary data rate is established, the control logic 163 continues to monitor the line conditions to determine whether to update the constellation density settings 166 for changing the secondary data rate in response to changing line conditions, as described above for the primary data rate, until a "yes" determination is made in block 231.

Accordingly, when a vectoring fault occurs, the vector logic 77 is configured to disable vectoring for the interferers affected by the error in order to prevent vectoring operations based on obsolete vectoring coefficients from affecting the quality of the communicated signals. The transceivers 55 communicating signals affected by the suspended vectoring operations are also configured to adjust their constellation density profiles, thereby reducing their data rates, to accommodate the increased noise level resulting from the loss of vectoring. By handling the vectoring fault in such manner, communication between the transceivers 55 and their corresponding CP transceivers 15 can continue without requiring a retrain. Therefore, the DSL customers should continue to enjoy high-speed data service without interruption.

Upon restoration of a vectoring fault, the vectoring processing will continue to improve the signal quality by joining the previously affected transceivers line by line. The recovery of the vectoring process is similar to the initial training of the vectoring group except some of the lines in the vectoring group, that were not affected by the vectoring fault, can adapt from a partially vectoring to fully vectoring system when the vectoring fault is fully restored.

Now, therefore, the following is claimed:

1. A communication system, comprising:
a first line card having a first transceiver coupled to a first subscriber line, and
a second line card having a second transceiver coupled to a second subscriber line, the second transceiver configured to communicate across the second subscriber line at a data rate during a data phase that follows a training phase, the second line card having vector logic configured to perform vectoring, based on at least one vectoring coefficient, to cancel from a signal communicated across the second subscriber line crosstalk induced by a signal communicated across the first subscriber line, the vector logic configured to update the vectoring coefficient based on vectoring information from the first line card, wherein the data rate is selected in the training phase, wherein the vector logic is configured to disable the vectoring in response to a detection of a vectoring fault that prevents the second line card from receiving vectoring information from the first line card, and wherein the second line card has control logic configured to adjust the data rate at which the second transceiver communicates across the second subscriber line in response to the detection of the vectoring fault without the second transceiver performing a retrain.

2. The system of claim 1, further comprising a third line card, wherein the first, second, and third line cards are interconnected via a ring connection, and wherein the first line card is configured to transmit vectoring information to the second line card via the ring connection.

3. The system of claim 1, wherein the second transceiver has memory for storing constellation density settings indicating constellation densities for tones communicated by the second transceiver, and wherein the control logic is configured to update the constellation density settings in response to the detection of the vectoring fault.

4. The system of claim 3, wherein the control logic is configured to estimate, based on the vectoring coefficient, an increase in a noise level for signals communicated by the second transceiver resulting from a loss of the vectoring, and wherein the control logic is configured to adjust the constellation density settings based on the estimated increase in the noise level.

5. The system of claim 3, wherein the control logic is configured to transmit, in response to the detection of the vectoring fault, data via a control channel across the second subscriber line, the data indicative of the updated constellation density settings.

6. The system of claim 5, wherein a data rate of the control channel is sufficiently low such that communication via the control channel is ensured without performing vectoring for canceling crosstalk that couples from the first subscriber line into the control channel.

7. A communication method, comprising:
communicating signals across a first subscriber line via a first line card having a first transceiver coupled to the first subscriber line;
communicating signals across a second subscriber line via a second line card having a second transceiver coupled to the second subscriber line, the communicating signals across the second subscriber line comprising communicating across the second subscriber line at a data rate by the second transceiver during a data phase that follows a training phase;
selecting the data rate based on training signals communicated by the second transceiver in the training phase;
performing vectoring, based on at least one vectoring coefficient, to cancel from at least one signal communicated across the second subscriber line crosstalk induced by at least one of the signals communicated across the first subscriber line;
transmitting vectoring information from the first line card to the second line card;
updating the vectoring coefficient based on the vectoring information;
detecting a vectoring fault that prevents the second line card from receiving vectoring information from the first line card;
disabling the vectoring in response to the detecting; and
adjusting the data rate at which the second transceiver communicates across the second subscriber line in response to the detecting without the second transceiver performing a retrain.

8. The method of claim 7, wherein the transmitting comprises transmitting the vectoring information via a ring connection that interconnects the first line card, the second line card, and a third line card.

9. The method of claim 7, further comprising:
storing, in memory, constellation density settings indicating constellation densities for tones communicated by the second transceiver; and
updating the constellation density settings in response to the detecting.

10. The method of claim 9, further comprising estimating, based on the vectoring coefficient, a signal quality parameter for signals to be communicated by the second transceiver after the disabling, wherein the adjusting is based on the estimating.

11. The method of claim 9, further comprising transmitting, in response to the detecting, data via a control channel across the second subscriber line, the data indicative of the updated constellation density settings.

12. The method of claim 11, wherein a data rate of the control channel is sufficiently low such that communication via the control channel is ensured without performing vectoring for canceling crosstalk that couples from the first subscriber line into the control channel.

13. The system of claim 1, wherein the control logic is configured to select the adjusted data rate in response to the detection of the vectoring fault based on a training signal communicated in the training phase.

14. The method of claim 7, wherein the adjusting comprises selecting the adjusted data rate in response to the detecting based on a training signal communicated in the training phase.

* * * * *